May 17, 1938.    T. R. HARRISON ET AL    2,117,800
FLUID PRESSURE CONTROL APPARATUS
Filed July 19, 1935    3 Sheets-Sheet 1

INVENTOR.
THOMAS R. HARRISON
FREDERICK W. SIDE
BY John E. Hubbell
ATTORNEY

Patented May 17, 1938

2,117,800

UNITED STATES PATENT OFFICE 2,117,800

FLUID PRESSURE CONTROL APPARATUS

Thomas R. Harrison, Wyncote, and Frederick W. Side, Philadelphia, Pa., assignors to The Brown Instrument Company, Philadelphia, Pa., a corporation of Pennsylvania Application July 19, 1935, Serial No. 32,138

25 Claims. (Cl. 236—82)

The general object of the present invention is to provide improved control apparatus of the type comprising an element deflecting in accordance with changes in the value of a controlling quantity or condition, means through which the deflection of said element from the predetermined or normal value position of the element varies an air or other fluid pressure constituting a control force, and simple and effective fluid pressure means through which the variation in said control force modifies the action of said element on the first mentioned means so as to effect suitable corrective variations in the control force on a departure of the latter from its predetermined or normal value, without creating an objectionable tendency to unstable control, or hunting.

More specific objects of the invention are to provide improvements in air actuated controllers of the type devised by us and forming the subject matter of our prior application Serial No. 693,388, filed October 12, 1933. The controller disclosed in said prior application comprises an air chamber or space, valve means regulating a control pressure maintained in said space, a device responsive to a control condition for effecting an adjustment of said valve means and thereby varying the pressure in said space when said control condition changes, and a mechanism which is responsive to changes in said control pressure and is actuated on a change therein produced by an initial adjustment of said valve means by said device, to give said valve means a second, or follow up, adjustment tending to a reverse change in said control pressure, and thereafter a third, or compensating, adjustment in the direction to eliminate said second adjustment.

Our improved controller disclosed and claimed herein, comprises novel fluid pressure means through which the effect of a pressure change in the said air space, produced by an initial adjustment of the valve means by the device responsive to the control condition, controls the timing and magnitude of the resultant follow-up adjustment.

A specific object of the present invention is to provide a control action in which a relatively large initial corrective kick or control effect may be made on a change in the controlling quantity, while avoiding the tendency to hunting which would result from such a large initial adjustment, if the control system did not include provisions for a suitable subsequent follow-up adjustment. In accordance with the present invention, the period of each initial kick effect is prolonged by provisions which we make for delaying the succeeding follow-up adjustment.

Air actuated controllers embodying the features of our present invention may take widely different forms, and are adapted for use for many different purposes. In general, they may be used whenever it is desirable to produce a control effect in response to a change in a control condition or quantity, such, for example, as a temperature, a pressure, or a velocity which may or may not vary or tend to vary as a result of the control effect produced.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Figure 1:
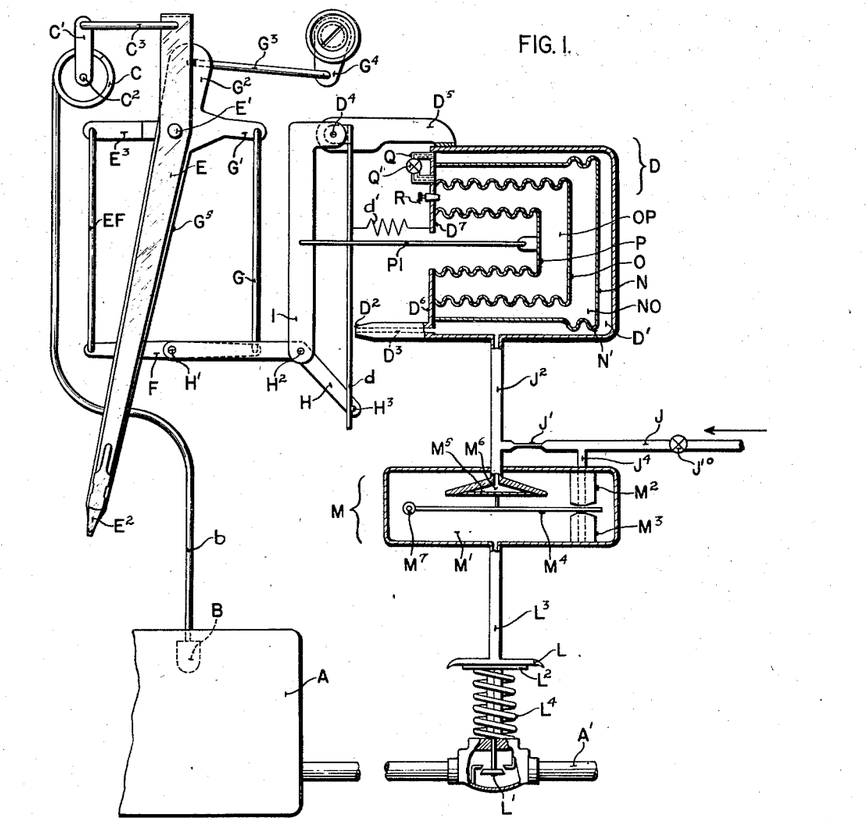
Fig. 1 is a diagrammatic representation, with parts broken away and in section, of a control system including one embodiment of the present invention.

The particular form of control system diagrammatically shown by way of example in Fig. 1, is adapted to adjust a furnace controller L and thereby regulate the supply of heat to a furnace A, as required to maintain an approximately constant furnace temperature, which is measured by an expansion fluid thermometer of which B is the temperature responsive bulb or chamber. As shown, the controller L is a throttling valve in the furnace fuel supply pipe A'. The fluid pressure in the chamber B, which increases and decreases as the furnace temperature rises and falls, is transmitted by a conduit $b$ to a pressure responsive element C. The latter is shown as a Bourdon tube of helical form having one end stationary and connected to the conduit $b$, and having its other end closed and movably secured to an arm C', which is pivoted to turn about an axis $C^2$, clockwise or counterclockwise as the pressure in the tube C rises or falls.

Through suitable connections, the oscillations of the arm C' give motion to the valve $d$, which, as shown, is a so-called flapper, or flapper valve forming a part of a control pressure regulator or air controller unit or device D. The valve $d$ regulates the escape of air from, and thereby regulates the control air pressure in the chamber D' of said device D. Variations in that pressure affect adjustments of the valve L, as hereinafter described. The connections through which the oscillations of the arm C' affect the position of the valve $d$, comprise a rocking element which includes an exhibiting element in the form of a recorder arm E, which is secured on a rock shaft E', and carries a pen point or other marking device $E^2$ at one end, and has its opposite end connected by a link $C^3$ to the arm C'. The axis of the shaft E' is parallel to, but laterally displaced from the axis $C^2$. An arm $E^3$ from the rocking element shaft E', is connected by a link EF to one end of a lever F. A link G pivotally connected to the other end of the lever F forms an adjustable fulcrum for the latter. The end of the link G remote from the lever F is connected to an arm G' of a lever element journalled on the shaft E' and having other arms $G^2$ and $G^5$. The arm $G^2$ is connected by a link $G^3$ to a part $G^4$ which may be manually adjusted to thereby adjust the fulcrum of the lever F. The effect of such adjustment is to vary the control temperature which the control system tends to maintain. The arm $G^5$ forms a pointer indicating the control temperature which the apparatus is intended to maintain. The said control temperature, and the existing furnace temperature, may each be indicated on a suitably scaled record chart (not shown), on which a record of the last mentioned temperature is made by the marking element $E^2$. Preferably, the lever F is directly beneath the arms $E^3$ and G', so that the links EF and G form suspension links, and lost motion in the supporting connection for the lever F does not interfere with the desired control effect produced by the movements of that lever.

The movements given the lever F, affect the position of the valve $d$ through a lever H which has one arm connected by a pivot pin H' to the lever F between the connections of the latter to the links EF and G. The lever H is connected to a support I by a pivot pin $H^2$ which forms the fulcrum for the lever H. Turning movements of the lever H about the pivot pin $H^2$ and bodily movements of the latter resulting from the hereinafter described movements of the support I, act, through a projection $H^3$ from the lever H, on the valve $d$ to move the latter toward and away from a seat $D^2$ formed at the end of a nozzle portion of the unit D and thereby variably throttle the escape of fluid from the chamber D' through a bleeder or vent passage $D^3$ which extends through the nozzle and seat $D^2$. The valve $d$, which as shown is in the form of a sheet metal strip, is journalled on a pivot pin $D^4$ mounted in a bracket extension $D^5$ from the shell or body of the disc D. A bias spring $d'$ acting between the valve $d$ and the end $D^6$ of the shell or body of the device D, constantly urges the valve $d$ toward its seat. The projection $H^3$ engages the side of the valve $d$ adjacent its seat.

On an increase in the control temperature to which the bulb B is subject, clockwise movements given to the arm C', levers F and H, and valve $d$, move the latter away from its seat and thereby diminish the pressure in the chamber D'. On a decrease in said control temperature, the arm C' and levers F and H are given counter-clockwise adjustments and permit a counter-clockwise adjustment of the valve $d$ effected by the spring $d'$ and increasing the pressure in the chamber D'. The movement of the valve $d$ toward or away from the seat $D^2$ increases or decreases the pressure in the chamber D' by virtue of the fact that pressure fluid is constantly being supplied to the chamber D', so that the pressure in said chamber is increased or decreased by increasing or decreasing the throttling effect of the valve $d$ on the vent passage $D^3$. As shown, the means for constantly supplying pressure fluid to the chamber D' includes a pipe J leading from a suitable source (not shown) of pressure fluid and communicating with the chamber D' through a restricted flow passage J' and a pipe section $J^2$. The fluid pressure at the supply end of the restricted passage J' may be controlled by a regulating valve $J^{10}$ manually or automatically adjustable to maintain said pressure at a suitable and approximately constant value.

The pressure in the chamber D' controls the adjustment of the valve L, through a pressure relay device M. The latter includes a pressure chamber M' with an inlet $M^2$ receiving air from the pipe J through a branch pipe $J^4$. An outlet $M^3$ is provided for the escape of air from the chamber M' to the atmosphere. The pressure in the chamber M' is controlled by a valve member $M^4$ pivoted at $M^7$ and movable between the ends of the passages $M^2$ and $M^3$ which open to the chamber M'. A movement of the valve member $M^4$ in one direction diminishes flow through the inlet passage $M^2$ and increases flow through the outlet passage $M^3$ and thereby reduces the pressure in chamber M', and a movement of the valve member $M^4$ in the opposite direction increases the pressure in chamber M' by increasing the flow through the inlet passage $M^2$ and diminishing the flow through the outlet passage $M^3$. The valve $M^4$ is automatically adjusted to maintain a pressure in the chamber M' which is in constant proportion to the pressure in the chamber D', by the connection of valve $M^4$ to a diaphragm $M^5$. The latter forms the movable wall of a diaphragm chamber $M^6$, in free communication with the chamber D' through the conduit $J^2$. The diaphragm $M^5$ is thus exposed at one side to the pressure in chamber D' at one side, and at its other side, to the pressure in the chamber M'.

The pressure in the chamber M', which is proportional to the control pressure in the chamber D', directly controls the regulating action of the fuel supply valve L. The latter is shown as a typical pressure motor valve comprising a movable valve member L' having its stem connected to a diaphragm $L^2$. The latter forms the movable wall of a pressure chamber to which the pressure in the chamber M' is transmitted by a conduit $L^3$. That pressure acts on the diaphragm $L^2$ in the direction to move the valve member L' away from its seat and increase the fuel flow through the conduit A'. The valve member L' is biased for movement to its closed position by a spring $L^4$ acting between the casing of the valve L and the diaphragm $L^2$. In operation, the valve member L' is normally held in an intermediate, partially open position, in which the action on the diaphragm $L^2$ of the pressure existing at the time in the chamber M', is balanced by the tension of the spring $L^4$. Therefore, as the control temperature to which the bulb B responds, increases or diminishes, and the pressure in the chamber M' is correspondingly decreased or increased, the throttling effect of the valve member L' on the fuel supply is decreased or increased.

The shell or the body of the controller unit or device D is advantageously formed as a cylinder with the valve $d$ in front of one end of the cylinder and generally transverse to the cylinder axis. At said one end of the shell or body, the latter has a head or end wall $D^6$, which is formed with openings as hereinafter described, and in practice is ordinarily made separable from the shell or body of the unit, though not so shown in the diagrammatic drawings. The opposite end wall of the shell or body is imperforate.

In the form of our invention shown in Fig. 1, three coaxial cup shaped elements N, O, and P are located within the shell of the unit D, each being formed of sheet metal and being connected at its rim or otherwise open end to the unit end wall $D^6$, which forms the support for the elements. The outer element N forms a portion of the wall of the chamber D', and is shown as having the major portion of the length of its body portion cylindrical and longitudinally inflexible, while a remaining short section N' is circumferentially corrugated so that it may contract and expand in length in response to variations in the difference between the pressure in the chamber D' and the pressure in the chamber or space NO between the element N and the element O. The body portion of each of the elements O and P is shown as a corrugated cylinder or bellows, and each is adapted to contract and expand in length on variations in the differential of the pressures acting on its inner and outer sides. Each of the elements N, O, and P thus acts like an ordinary pressure responsive bellows, in that it elongates or contracts as the differential of the pressures acting on the inner and outer sides of the element is varied. The extent of the change in element length produced by a given differential pressure is a function of the stiffness of the spring which is formed by the circumferentially corrugated wall or wall portion of the element, and which is compressed and shortened when the pressure at its outer side is greater than the pressure at the inner side, and which is put under tension and elongated when the internal pressure exceeds the external pressure, and which has a definite predetermined length when not subject to tension or compression. For the purposes served by the apparatus of Fig. 1, the spring formed by the element N may be much stiffer than the spring formed by the elements O and P. Such spring stiffness is obtained as shown, by corrugating a short portion only of the length of the element, but can obviously be obtained in other ways, for example, by merely increasing the wall thickness of the element.

The chamber D' and the chamber NO are connected by a pressure equalizing connection Q mounted on the end wall $D^6$ which is formed with port openings for the purpose. The connection Q includes a throttling valve Q' which may be adjusted to vary the restriction to flow between the chambers through the flow passage of said connection Q. The chamber space OP, between the elements O and P, is sealed except for a bleed passage through the end wall $D^6$ which may be variably restricted by an adjustable throttling valve R and through which atmospheric air may enter or leave the space OP accordingly as the pressure in that space is below or above the pressure of the atmosphere. The interior of the element P is in free communication with the atmosphere through a suitably large central opening $D^7$ in the end wall $D^6$.

The element I which provides the fulcrum support for the valve operating lever H, is pivotally supported on the pivot pin $D^4$ and extends across the axis of the element D as does the valve d. Intermediate the pivots $D^4$ and $H^2$, the member I is connected to one end of a link PI which extends axially of the unit D through the opening $D^7$ and has its other end pivotally connected to the movable inner end wall of the element P. In consequence, as the pressure in the chamber OP rises above or falls below the pressure of the atmosphere, the member I is moved in the direction to respectively decrease or increase the throttling effect of the valve d.

The control pressure in the chamber or space D' which is transmitted to, and controls the adjustment of the valve L, is a function of the extent to which flow through the passage $D^3$ is throttled, and is varied by varying the relative positions of the flapper valve member d and the nozzle valve seat $D^2$. Those relative positions are conjoint functions of the positions of two adjusting parts, namely, the lever H part, and the member I part. The lever part H is adjusted through the Bourdon tube C and associated parts in accordance with changes in the control condition. The part I is adjusted by means responsive to changes in the control pressure within the chamber or space D'. The last mentioned means comprise the two chambers NO and OP, which may be described as expansible chambers, because they have wall portions which move and thereby enlarge or contract the volumes of the chambers, in response to variations in the pressures acting on the opposite sides of said movable wall portions. In the form of the invention shown in Fig. 1, a movable wall portion of the chamber OP is directly connected, by link PI to the part I, which is thereby given movements as a result of pressure changes in the expansible chamber OP, and the pressure in the chamber OP is varied by a pressure change in the chamber or space D' through, and as a result of, a delayed change of pressure in the expansible chamber NO, and the action of the last mentioned pressure on a second movable wall portion of the chamber OP.

A change in the control temperature to which the bulb B is subjected, effects an initial adjustment of the valve d through turning movements of the lever H. The resultant initial change in the control pressure in D', produces a pressure change in the same direction in the expansible chamber NO and thereby in the expansible chamber OP. The latter pressure change causes the element P to change in length and thereby operates through the link PI and member I to give the valve d a follow-up adjustment opposite in direction to, and partially eliminating the said initial adjustment of that valve. The flow of air through the bleed passage including the throttling valve R, produced by a pressure change in the expansible chamber OP, tends to neutralize the initial pressure change in the expansible chamber OP, and will neutralize that change in time, if the angular position of the lever H is not subject to further change. As the neutralization of the pressure change in chamber OP proceeds, the element P approaches its normal length and thereby gives the valve d its compensating adjustment, which eliminates or cancels out more or less of the preceding follow-up adjustment.

In general, the effect of a follow-up adjustment, considered by itself, is to change the value of the control quantity which the control system tends to maintain in the same direction as the change in the actual value of the control quantity which results in the initial and follow-up adjustments. The reverse compensating adjustment, eliminates the effect of the follow-up adjustment on the value of the control apparatus which the control system tends to maintain. In general, the compensating adjustment must be effected slowly if hunting is to be avoided in any control system in which the effect of a change in the control force on the value of the control quantity is delayed, as it may be delayed in furnace control by temperature lag. The latter is dependent upon the heat storage capacity of the furnace, and affects the rate of response of the heat furnace temperature to a change in the rate of furnace heat supply. A control system effect analogous to that due to temperature lag is produced in different ways, for example, by the inertia of movable machine elements in controlling the operation of machinery, and by the fluid storage capacity of portions of a fluid distribution system in which fluid pressures or rates of flow are controlled. The effect of delaying the follow-up adjustment, as provided for in accordance with the present invention, is to increase the initial kick or control force over-adjustment effect, since that effect is a joint function of the magnitude and of the duration of the over-adjustment of the control force.

With the arrangement shown in Fig. 1, the timing of the follow-up and compensating adjustments are dependent on the adjustment of the valve Q', the timing of the compensating adjustments are dependent on the adjustment of the valve R, and the magnitude of the follow-up adjustments, and the reverse compensating adjustments, are jointly dependent on the adjustments of the two valves, Q' and R. The variation in the timing and magnitudes of the follow-up and compensating adjustments which can be effected by adjustment of the valves Q' and R, is highly advantageous, as those skilled in the art will understand, since the particular timing and magnitudes of the follow-up and compensating adjustments which will give optimum results in any control system ordinarily depend upon conditions of operation over which the control system has no control. For example, in the control system illustrated, and generally in any furnace control system, the character of the ultimate control results required to keep furnace temperature variations suitably small as the furnace load varies, while at the same time avoiding objectionable hunting, depends upon the so-called furnace temperature lag.

For its normal preferred use, the control system shown in Fig. 1 is so proportioned and calibrated that on an increase or decrease in the furnace heat requirement, made manifest by a decrease or increase in the temperature of the bulb B, the resultant initial adjustment of the valve d will make the rate of heat supply to the furnace appreciably greater or less, respectively, than the rate of furnace heat output. This is desirable in that it tends to shorten the time required to return the furnace temperature to its normal value. If the rate of heat supply is not suitably soon thereafter adjusted to make it more nearly equal to the rate of heat output, the change in the furnace temperature resulting from the initial adjustment will be more than that required to restore that temperature to its normal value. The follow-up adjustment action of the element P, if suitably timed and of suitable magnitude, will prevent such over correction of the furnace temperature and the hunting necessarily resulting from such over correction. With the apparatus of Fig. 1, the follow-up adjustment comprises a retarded component due to the relatively slow change in pressure in the chamber or space NO resulting from the restricted flow through the connection Q, and a practically instantaneous component due to the contraction or expansion of the element N occurring on an initial adjustment of the valve d and the resultant pressure change in chamber D'. The rapid initial change in length of the element N, by changing the volume of the chamber NO, reduces the initial difference between the pressures in the chambers D' and NO, but cannot equalize those pressures. The existence of a difference in said pressures, creates a flow through the connection Q tending to an eventual equalization of the two pressures, in the course of which, the element N is returned to its normal unstressed length.

As is evident, the time required for such pressure equalization, is a function of the throttling effect of the valve Q', and is diminished or increased by an adjustment of that valve to increase or decrease its throttling effect. The initial pressure equalizing effect due to the contraction or expansion of the element N, diminishes as the stiffness of the spring action of the element is increased. With the stiff spring action of the element regarded as preferable, that action has little or no significant effect on the time required for substantial pressure equalization by flow through the connection Q, though theoretically it has some effect on the average rate of flow through the connection Q, which, at any instant, depends not only on the throttling effect of the valve Q, but also on the existing pressure differential creating the flow.

So far as the general timing of the follow-up action is concerned, it is practically immaterial whether the element N has no longitudinal elasticity, or has the small amount of such elasticity preferably provided as stated above. The small elasticity which we preferably provide, has been found advantageous, however, in that it prevents a small control system oscillation or hunting tendency experienced when the flexible element N is replaced by a rigid partition between the chambers D' and NO.

Although the adjustment of the throttling valve Q' controls the timing of the follow-up adjustment, the magnitude of that adjustment is, to a substantial extent, dependent on the relative flow restricting capacities of the valves Q and R. While with any contemplated normal adjustment of the valve R, the flow past the latter has no significant effect on the pressure change in chamber OP produced by an instantaneous change in the pressure in chamber NO, that is not the case, however, with respect to the slow pressure changes produced by the flow through the connection Q.

The fact that the magnitude of the total follow-up adjustment depends on the relative rates of flow through the passages controlled by the valves Q' and R, becomes apparent when account is taken of the evident fact that if the valve R had no significant throttling effect, the expansion and contraction of the element O could produce no significant effect on the pressure in the chamber OP, and hence could produce no significant follow-up adjustment. As the throttling effect of the valve R is increased, the magnitude of the pressure change in the chamber OP, and the resulting follow-up adjustment, is increased. So far as the magnitude of the follow-up adjustment is concerned, substantially the same result may be obtained by increasing and decreasing the throttling effect of the valve R, as by decreasing or increasing the throttling effect of the valve Q. In the practical use of the form of apparatus shown in Fig. 1, however, the ultimate control of the magnitude of the follow-up adjustment, must depend upon and be varied primarily by an adjustment of the valve Q', since the valve R must be adjusted primarily with regard to its effect on the desired rate of compensating adjustment.

The compensating adjustment, as previously stated, results from the flow through the passage controlled by the valve R, which results from, and tends to eliminate the difference between the pressure in the chamber OP and the pressure of the atmosphere, and thereby tends to the return of the element P to its normal unstressed length, following any contraction or expansion of that element. With the form of the invention shown in Fig. 1, therefore, in the long run, the aggregate of the compensating adjustments will be exactly equal in magnitude, but opposite in direction, to the aggregate of the follow-up adjustments.

With the apparatus shown in Fig. 1, operating with furnace heat output and input exactly equal, and with the furnace temperature at its normal value, if there should be a particular change, for example an increase, in the furnace heat output, followed by a prolonged period of operation in which no further change in the rate of heat output occurs, the calibration and the operative effect of the control apparatus may be such as to produce the following results: namely, an initial adjustment of the valve $d$ which increases the fuel supply to make the new rate of furnace heat supply significantly higher than the new rate of heat output; a subsequent follow-up adjustment tending to slowly reduce the rate of heat input; and a compensating adjustment which slowly neutralizes or cancels out the follow-up adjustment. For steady operation with varying rates of heat output, it is theoretically necessary that the valve $d$ should occupy slightly different positions, and that the furnace temperature maintained be lower with a large rate than with a small rate of heat output. However, with the type of apparatus shown, the differences between the stable operation positions of the valve $d$ for different furnace loads may be made so small as to correspond to furnace temperatures which do not differ by practically significant or measurable amounts. With the assumed conditions, the initial excess in the rate of heat input over the rate of heat output, will result in a gradual increase in furnace temperature, and the consequent adjustment of the valve $d$ through the lever H in the direction opposite to that in which the valve was initially adjusted by that lever.

For the particular operating conditions assumed above, it may be assumed that the ideal calibration of the control apparatus would be that which would return the furnace temperature to its normal value in the shortest possible time in which the pressure in the chamber NO could be made exactly equal to the pressure in the chamber D' and the element P could be returned to its normal unstressed length. In practice, moreover, the control quantity, the furnace temperature in the apparatus shown in Fig. 1, is subject to fluctuation as a result of rapid changes in furnace load or some other operating condition, so that a new adjustment of the valve $d$ through the lever H, is apt to occur, before the follow-up and compensating adjustments resulting from a previous change in the control quantity, have been completed. In practice, therefore, the adjustments of the valves Q' and R which will give the best practical results, may not and usually will not be precisely those which would be ideal for any one assumed particular instantaneous change in the control quantity. The relatively simple mechanism shown in Fig. 1 permits, by suitable adjustment of the valves Q' and R, of a wide range of variation in the control system characteristics, thereby permitting a desirably good regulation under very different conditions of control operation.

Figure 2:
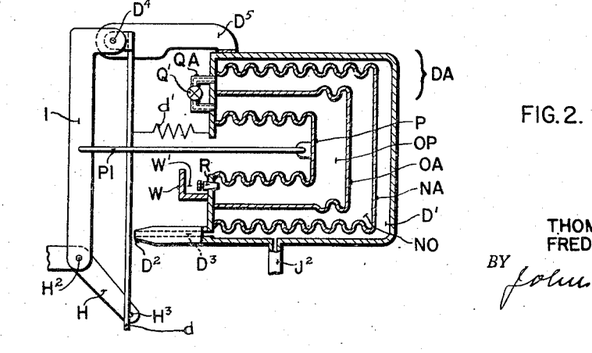
Figs 2, 3, 4, 5, 6 and 7 are diagrammatic representations, each partly in section and illustrating a different modification of a portion of the control apparatus shown in Fig. 1.

The controller unit DA shown in Fig. 2 differs in structure from that shown in Fig. 1, in that the intermediate bellows element OA of Fig. 2 is a stiff spring, shown as similar in form to the element N of Fig. 1, and the element NA of Fig. 2, replacing the element N of Fig. 1, is an ordinary flexible bellows, and not a stiff spring element. In addition to this difference between the intermediate and outer elements of the units, the unit DA omits the pressure equalizing connection Q between the chambers $D^1$ and NO of the unit D of Fig. 1, and includes in lieu thereof a similar equalizing connection QA permitting a pressure equalizing flow between the expansible chambers NO and OP, at a rate depending on the adjustment of the valve Q' of the connection QA. The structural differences just mentioned involve no significant general difference in operation between the units D and DA. In each unit, a pressure change in the chamber D' produces a delayed pressure change in the chamber OP, by and as a result of the pressure change in the intermediate chamber NO directly produced by the pressure change in D'. In the unit D the valve Q' directly delays pressure changes in chamber NO, and in the unit DA, the valve Q' directly delays pressure changes in chamber OP, but the ultimate delay in the pressure changes in chamber OP due to pressure changes in D', may be the same in each unit.

Figure 3:
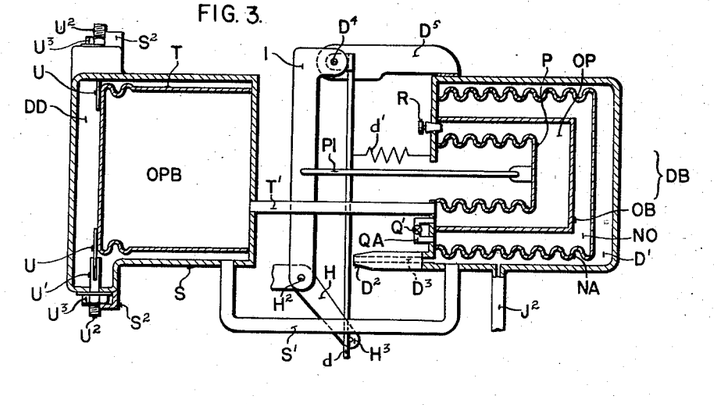

The modification illustrated in Fig. 3, comprises a control unit DB which differs from the unit DA in respect to the element OB which replaces the element OA of Fig. 2, and by the use of two additional pressure chambers OPB and DD. The element OB of Fig. 3 is a rigid cup shaped part. The chamber DD comprises the space within a shell S and surrounding a cup shaped element T within the shell S and secured at its rim or otherwise open end to one end wall of the shell S. As shown, the element T is a stiff bellows element like the previously described elements N and OA. The chamber or space DD is connected by a pipe or conduit S' to the space D' of the unit DB so that the pressures in the chambers D' and DD are the same. The chamber OPB, which is enclosed by the element T and the wall of the shell S to which that element is connected, is in free communication with the expansible chamber OP by means of a pipe or a conduit T'.

The operation of the unit DB is generically like that of each of the units D and DA, and is specifically like that operation of the unit DA in that the follow-up adjustment is delayed by means of a restricted pressure equalizing connection QA, between the chambers NO and OP. In the unit DB, the contraction and expansion of the expansible chamber NO does not of itself produce an instantaneous follow-up adjustment effect, owing to the rigid character of the element OB. A pressure change in the chamber D' produces an instantaneous follow-up adjustment effect, however, since the resultant pressure change in the chamber DD, by contracting or expanding the element T, produces a practically instantaneous transfer of fluid through the conduit T', and thereby increases or decreases the pressure in the chamber OP.

In any of the forms of the invention disclosed, the spring stiffness of any of the expansible elements may be made regulable if necessary or desirable, as by the use of adjusting provisions, such as are shown in Fig. 3 for adjusting the effective spring stiffness of the element T and thereby modifying the instantaneous follow-up adjustment effect of that element. The adjusting provisions shown in Fig. 3, comprise a plurality of blade-like spring elements U, each welded or otherwise secured at one end to the movable end wall of the element T, and having an opposite end portion extending transversely to the axis of the element T and received in a longitudinally extending slot U' formed in an aligned longitudinal adjustable spring anchorage member $U^2$. Each element $U^2$, as shown, is mounted for longitudinal adjustment by the rotation of a nut $U^3$ which receives a threaded outer end portion of the part $U^2$ and is revolubly mounted in a pocket portion $S^2$ of the shell S. The effect of the longitudinal adjustment of each member $U^2$ is to increase or decrease the length and thereby decrease or increase the stiffness of the corresponding spring element U. The spring elements U are so disposed that they oppose variations in either direction, of the normal unstressed length of the element T.

Figure 4:
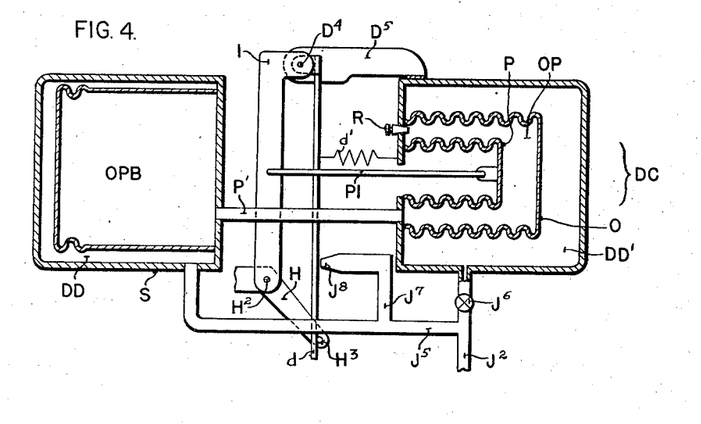

The modification shown in Fig. 4 comprises a unit DC, in which the expansible chamber OP is connected by a conduit P' to an expansible chamber OPB located within a shell S which also includes an expansible chamber DD as in Fig. 3. In the arrangement shown in Fig. 4, however, the unit shell which includes the expansible element P, includes no element corresponding to the previously described element N or NA, though it includes an expansible element O like that shown in Fig. 1. The expansible chamber DD' between the rigid outer shell of the unit DC and the expansible element O of Fig. 4, does not serve the purpose or function of the control pressure chamber or space D' of the forms of the invention previously described. On the contrary said function and purpose are served in Fig. 4, by the chamber or space DD. In Fig. 4, the pipe $J^2$ is in free communication with the space DD through a conduit or pipe section $J^5$, and is in restricted communication with the chamber or space DD' through a restricted passage variably throttled by a valve $J^6$. In Fig. 4 the control pressure in the chamber DD and pipe $J^2$, is directly dependent upon the relative positions of the flapper valve d and the valve seat $J^8$ at the end of a nozzle branch $J^7$ from the pipe $J^5$.

In the operation of the apparatus shown in Fig. 4, the relative magnitudes and timing of the initial, follow-up and compensating adjustments may be exactly the same as are obtainable with the forms of apparatus shown in Figs. 1, 2, and 3. In respect to the initial adjustment, and to the instantaneous follow-up adjustment due to the expansion and contraction of the element T, the apparatus shown in Fig. 4 operates exactly like that of the apparatus shown in Fig. 3. The delayed follow-up adjustment, which in Figs. 1, 2, and 3 depends on flow through the pressure equalizing connection Q or QA is obtainable with the apparatus of Fig. 4 by the flow into the chamber DD' from the pipe $J^2$, which is regulated by adjustment of the valve $J^6$. The throttling action of the last mentioned valve directly affects the rate at which the pressure in the expansible chamber DD' is made equal to the control pressure following a change in the latter. Thus in Fig. 4 as in all of the other forms of apparatus disclosed, the delayed follow-up adjustment depends on a pressure change in an expansible chamber, OP, produced by and resulting from pressure changes which are produced in a second expansible chamber, NO in Figs. 1, 2, and 3, and DD' in Fig. 4, and which are produced by changes in the control pressure.

While all of the forms of apparatus disclosed are well adapted for use, and may be used with compressed air as the fluid employed to provide the variable control pressure, all of said forms of apparatus may also be used with other fluids, and in particular with a liquid, in the conduits and chambers of the apparatus, without changes in the latter, except those obviously desirable to the use of a non-elastic fluid medium in lieu of an elastic medium such as compressed air. The use of compressed air as the control pressure fluid, possesses the obvious advantage that it may be freely wasted to the atmosphere without objectionable economic loss or other objectionable effect. In effecting the slow follow-up and compensating adjustments, however, it may be desirable in some cases, at least, to employ a liquid such as a suitable oil for retarded flow through restricted passages. For example, in the form of the invention shown in Fig. 2, the chambers NO and OP may be filled with oil. The use of oil in those chambers does not require any structural change, other than the addition to the wall $D^6$ of an external part W uniting with the wall $D^8$ to form an oil well or reservoir space W', which is open at its top to the atmosphere, and which is in communication adjacent its bottom with the chamber OP through the restricted passage variably throttled by the valve R.

In such case, oil will pass through the passage controlled by the valve R into or out of the chamber OP as the latter elongates and contracts. As will be apparent, except for the trifling effect due to variation in the head of oil in the space W', when oil fills the chambers NO and OP and more or less of the space W', there will be the same tendency to an equalization of the pressure in the chamber OP with the pressure of the atmosphere, as exists when the only fluid in the chambers NO and OP is atmospheric air.

Figure 5:
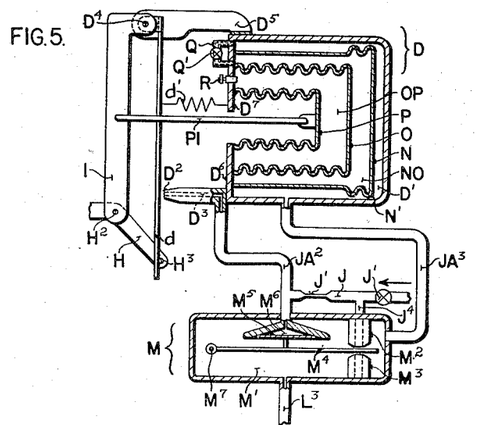

Fig. 5 illustrates a modification of the apparatus of Fig. 1 in which the movement of the flapper valve d with respect to the nozzle $D^2$, variably controls the pressure in a pipe $JA^2$ which replaces the pipe $J^2$ of Fig. 1. In Fig. 5 the pressure in the pipe $JA^2$ is caused to directly act upon the diaphragm $M^5$ and thereby control the valve L as in Fig. 1, but the pipe $JA^2$ differs from the pipe $J^2$ in that the latter is not in communication with the chamber D', but the functions obtained through the action of bellows unit D of Fig. 1 are obtained in Fig. 5 by means of a pipe $JA^3$ connecting the chamber D' with the chamber M'. A change in pressure in the chamber M' will result in follow up and compensating movements of the bellows N, O and P in exactly the same manner that the movements of said bellows occur when the pipe J² is in communication with the space D' as in Fig. 1. In Fig. 5 the pressure in the space D' will be equal at all times to the pressure on the diaphragm L² of the valve L.

Figure 6:
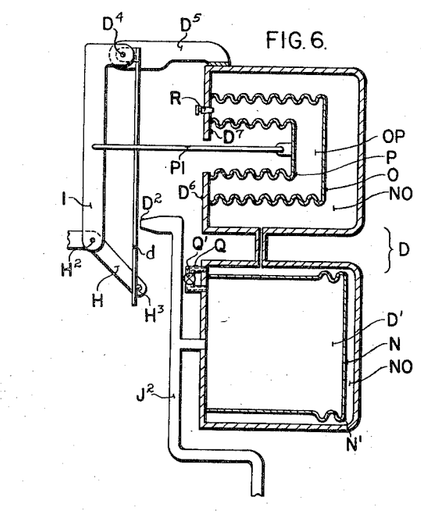
Figure 7:
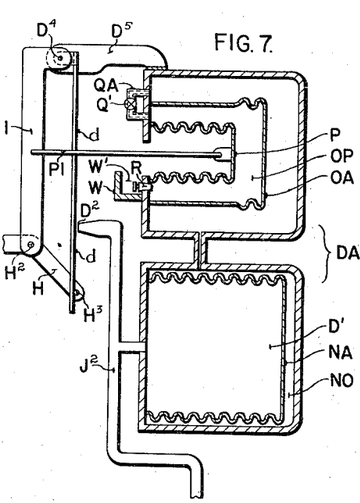

It will be clear to those skilled in the art that various modifications in the relation of the parts may be made without departing from the spirit of the invention. For example, we have illustrated in Figs. 6 and 7 modifications respectively of Fig. 1 whereby the various units of the system are differently arranged without functional change. In each of the last mentioned figures the correspondingly identified parts perform the same functions as in Fig. 1. It is sometimes desirable in practice for ease in assembly and adjustment, to arrange the parts as illustrated in Figs. 6 and 7.

It will be noted in the various embodiments that while we have illustrated bellows members having different values of stiffness, the same general objects and advantages may be obtained with bellows having the same longitudinal resiliency. In Fig. 1 for example an effect corresponding to the effect obtained in the apparatus of that figure with the bellows N of less longitudinal resilience than the bellows ONP, may be obtained by making the bellows N of the same degree of stiffness as the bellows ONP.

In our co-pending application Ser. No. 32,028 filed July 16, 1935, we disclose and generically claim certain novel features possessed in common by the apparatus disclosed herein, and by the different forms of apparatus disclosed in said co-pending application Ser. No. 32,028, for modifying the timing and magnitude of the follow-up adjustments resulting from initial changes in a control pressure.

While in accordance with the provisions of the statutes, we have illustrated and described the best forms of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. Fluid pressure control apparatus comprising a control pressure chamber and means for effecting an initial adjustment of the control pressure therein, of means actuated by a change in said control pressure to effect a follow-up adjustment of the latter and comprising a pressure adjusting part, an expansible chamber including a wall portion moving in response to changes in pressure in said expansible chamber and the movements of which give adjustment movements to said part, and a second expansible chamber in which a pressure change is produced by a change in said control pressure and which is operative on a change in pressure therein to vary the pressure in the first mentioned expansible chamber and thereby move said wall portion and part.

2. Apparatus as specified in claim 1, comprising means for variably restricting the rate at which the pressure in one of said expansible chambers is varied in response to a pressure change in said chamber.

3. Apparatus as specified in claim 1, comprising a restricted flow passage between the second expansible chamber and one of the other chambers specified in claim 1.

4. Apparatus as specified in claim 1, comprising a restricted flow passage between the second expansible chamber and the chamber first mentioned in claim 1.

5. Apparatus as specified in claim 1, comprising a restricted flow passage between the two expansible chambers specified in claim 1.

6. Apparatus as specified in claim 1, in which two of the chambers specified in claim 1 contain liquid and comprising a restricted flow passage through which said liquid may flow between said chambers.

7. Apparatus as specified in claim 1, comprising a restricted flow passage connecting the expansible chamber first mentioned in claim 1 to a source of fluid under a substantially constant pressure.

8. Apparatus as specified in claim 1, comprising a restricted flow passage connecting the expansible chamber first mentioned in claim 1 to the atmosphere.

9. Apparatus as specified in claim 1, comprising liquid in the two expansible chambers specified in claim 1, a restricted flow passage connecting said chambers, a liquid reservoir space, and a restricted flow passage between said space and the expansible chamber first mentioned in claim 1.

10. Apparatus as specified in claim 1, comprising a wall separating the second expansible chamber and one of the other chambers specified in claim 1 and adapted to flex slightly in response to differences between the pressures in the chambers which it separates, and comprising a restricted flow passage connecting the chambers separated by said wall.

11. Apparatus as specified in claim 1, comprising a wall separating the second expansible chamber and one of the other chambers specified in claim 1, and a second wall separating said second expansible chamber from the third chamber mentioned in claim 1, and in which one of said walls is adapted to flex more freely than the other in response to a difference between the pressures in the chambers separated by the wall.

12. Apparatus as specified in claim 1, comprising a relatively flexible wall separating the second expansible chamber and one of the other chambers specified in claim 1 and a relatively inflexible wall separating said expansible chamber from the third chamber mentioned in claim 1 and comprising a restricted flow passage connecting the chambers separated by said relatively inflexible wall.

13. Apparatus as specified in claim 1, comprising means for effecting a pressure change in the second mentioned expansible chamber in claim 1 in rapid response to a change in the control pressure, and means for effecting a change in the pressure in said first mentioned expansible chamber in slow response to a change in said control pressure.

14. Apparatus as specified in claim 1, comprising a restricted flow passage connecting the two expansible chambers specified in claim 1, and means for effecting a rapid flow of fluid into and out of the expansible chamber first mentioned in claim 1 on an increase or decrease respectively in the pressure in the chamber first mentioned in claim 1.

15. Apparatus as specified in claim 1, comprising a restricted flow passage connecting the two expansible chambers specified in claim 1, and comprising two chambers in addition to those specified in claim 1 and a wall separating said additional chambers, and adapted for a restricted movement in response to relative changes in the pressures at the opposite sides of said wall, one of said additional chambers being in communication with the chamber first mentioned in claim 1, and the other of said additional chambers being in communication with the expansible chamber first mentioned in claim 1.

16. Apparatus as specified in claim 1, comprising a chamber in addition to the chambers specified in claim 1, a resilient wall separating the said additional chamber from the expansible chamber first mentioned in claim 1, and a restricted flow passage connecting said additional chamber to the chamber first mentioned in claim 1.

17. Fluid pressure control apparatus comprising in combination a rigid shell, three cup shaped elements within said shell and in nesting relation with one another and each connected at its rim to said shell, said elements and shell being spaced away from one another to provide two expansible chambers separated from one another by the intermediate one of the three elements and to provide a control pressure chamber between the outer element and said shell, the inner element and one of the other two elements being each adapted to expand and contract in length more freely than the remaining element in response to a given difference between the pressures acting on the inner and outer sides of the element, said apparatus including a restricted flow passage connecting the chambers at the opposite sides of said remaining element, and means for maintaining a regulated control pressure in said control pressure chamber comprising means for effecting an initial variation in said pressure and means actuated by the resultant contraction or expansion of said inner element to produce a reverse change in the latter.

18. Fluid pressure control apparatus comprising in combination a rigid shell, three cup shaped elements within said shell and in nesting relation with one another and each connected at its rim to said shell, said elements and shell being spaced away from one another to provide two expansible chambers separated from one another by the intermediate one of the three elements and to provide a control pressure chamber between the outer element and said shell, said shell being formed with an aperture through which the interior of said inner bellows is in free communication with the atmosphere and the expansible chamber between the inner and intermediate elements being in communication with the atmosphere through a restricted flow passage, the inner element and one of the other two elements being each adapted to expand and contract in length more freely than the remaining element in response to a given difference between the pressures acting on the inner and outer sides of the element, said apparatus including a restricted flow passage connecting the chambers at the opposite sides of said remaining element, and means for maintaining a regulated control pressure in said control pressure chamber comprising means for effecting an initial variation in said pressure and means actuated by the resultant contraction or expansion of said inner element to produce a reverse change in the latter.

19. Fluid pressure control apparatus comprising in combination a control pressure space, a port communicating with said space, two independently adjustable parts for variably throttling flow through said port and thereby varying said control pressure in accordance with the conjoint adjustments of said parts, means for adjusting one of said parts in accordance with a control condition, and mechanism for adjusting the second of said control parts comprising an expansible chamber having a movable wall portion connected to said second part for adjustment of the latter on movement of said wall portion and having a restricted port constantly connecting said chamber to a source of constant fluid pressure, and means through which pressure changes in said space produce delayed changes in the pressure in said chamber.

20. Fluid pressure control apparatus comprising in combination a control pressure space, a port communicating with said space, two independently adjustable parts for variably throttling flow through said port and thereby varying said control pressure in accordance with the conjoint adjustments of said parts, means for adjusting one of said parts in accordance with a control condition, and mechanism for adjusting the second of said adjustable parts comprising an expansible chamber having a movable wall portion connected to said second part for adjustment of the latter on movement of said wall portion, and having a restricted port constantly connecting said chamber to a source of constant fluid pressure, and means including an adjustable flow throttling device through which a pressure change in said space produces a pressure change in said chamber more or less rapidly depending on the adjustment of said device.

21. Fluid pressure control apparatus comprising in combination, a control pressure space, a port communicating with said space, two independently adjustable parts for variably throttling flow through said port and thereby varying said control pressure in accordance with the conjoint adjustments of said parts, means for adjusting one of said parts in accordance with a control condition and mechanism for adjusting the second of said adjustable parts comprising an expansible chamber having a movable wall portion connected to said second part for adjustment of the latter on movement of said wall portion and having a restricted port constantly connecting said chamber to a source of constant fluid pressure, a second expansible chamber, means through which pressure changes in said space produce pressure changes in the last mentioned chamber, and means through which the last mentioned pressure changes produce pressure changes in the first mentioned chamber, one of the two last mentioned means being adjustable to vary the time required for the effect on the pressure in the first mentioned chamber of a pressure change in said space.

22. Fluid pressure control apparatus comprising in combination a control pressure space, a port communicating with said space, and two independently adjustable parts for variably throttling flow through said port and thereby varying said control pressure in accordance with the conjoint adjustments of said parts, means for adjusting one of said parts in accordance with a control condition, and fluid pressure means actuated by a change in the pressure in said space and including a flow throttling device for adjusting the second of said parts in the direction to partially neutralize said pressure change and at a rate dependent on the flow throttling effect of said device.

23. Fluid pressure control apparatus comprising a control pressure space and means for effecting an initial adjustment of the control pressure therein in response to a change in a control quantity, of means actuated by a change in said control pressure to effect a follow-up adjustment of the latter and comprising an adjustment part, an expansible chamber including a flexible wall portion, the movements of which give adjusting movements to said part, a second expansible chamber in which a pressure change is produced by a change in said control pressure and operative independently of said adjustment part on a change in pressure therein to vary the pressure in the first mentioned chamber and thereby move said wall portion and part, and regulable means for variably restricting the rate at which the pressure in one of said chambers is changed.

24. Fluid pressure control apparatus comprising in combination, a control pressure chamber with a port communicating therewith and having a resilient wall portion, a flapper valve controlling flow through said port, a movable lever support, a lever pivotally connected to said support and adapted to move said valve to vary flow through said port on a turning movement of the lever about its pivotal connection to said support and on a movement of the latter, and fluid pressure means for moving said support in response to a change in said pressure comprising a resilient bellows element having one end fixed and having its opposite end closed and connected to said support and means including a resilient wall forming an expansible chamber surrounding said bellows element and a second expansion chamber separated from the first mentioned expansible chamber by the last mentioned resilient wall portion and separating from the first mentioned chamber by the first mentioned resilient wall portion, one of said wall portions being less resilient than the other, and a restricted flow passage connecting the chambers separated by the less resilient wall portion.

25. Fluid pressure actuated control apparatus comprising in combination a control pressure chamber, and means for creating an initial control pressure change in said chamber on a change in a control quantity, and means adapted to effect a change in said control pressure following and opposite in direction to said initial change and comprising an expansible chamber in which a pressure change is produced by a change in pressure in the first mentioned chamber, a second expansible chamber in which a pressure change is produced by a change in the first mentioned expansible chamber, a control pressure regulating element adjusted by changes in pressure in said second expansible chamber, and means for delaying the said pressure change in one of said expansible chambers to thereby delay the follow-up adjustment of said element resulting from said initial control pressure change.

THOMAS R. HARRISON.
FREDERICK W. SIDE.